United States Patent

[11] 3,541,966

| [72] | Inventor | Richard Johnson Greaves<br>165 Tramway Parade, Beaumaris,<br>Australia |
|---|---|---|
| [21] | Appl. No. | 711,756 |
| [22] | Filed | March 8, 1968 |
| [45] | Patented | Nov. 24, 1970 |
| [32] | Priority | March 10, 1967 |
| [33] | | Australia |
| [31] | | No. 18,793/67 |

[54] STORAGE FACILITY
11 Claims, 11 Drawing Figs.

[52] U.S. Cl. .................................................. 104/162,
 104/165
[51] Int. Cl. .................................................. B61b 13/12
[50] Field of Search .......................................... 104/154,
 135, 1, 162, 172, 165; 105/Inq

[56] References Cited
UNITED STATES PATENTS

| 2,900,922 | 8/1959 | Edmonds ...................... | 104/162 |
| 3,055,313 | 9/1962 | Stoll et al. .................... | 104/162 |
| 3,080,204 | 3/1963 | Lindhgren .................... | 104/162X |
| 3,162,144 | 12/1964 | Ingold .......................... | 104/162 |
| 3,260,220 | 7/1966 | Ludwig ........................ | 104/162X |

Primary Examiner—Duane A. Reger
Attorney—Sughrue, Rothwell, Mion, Zinn and Mac Peak ABSTRACT: A mobile storage facility comprising a plurality of storage structures which are movable along a track, extensible power means which is movable so that it can be positioned to engage at least one storage structure of any adjacent pair of storage structures which are in buff with one another such as then to be operable to exert a force on the one structure of the pair to move that structure away from the other structure of the pair, the reaction to the force being resisted by engagement of the extensible means with the other structure of the pair or with a fixed component of the facility.

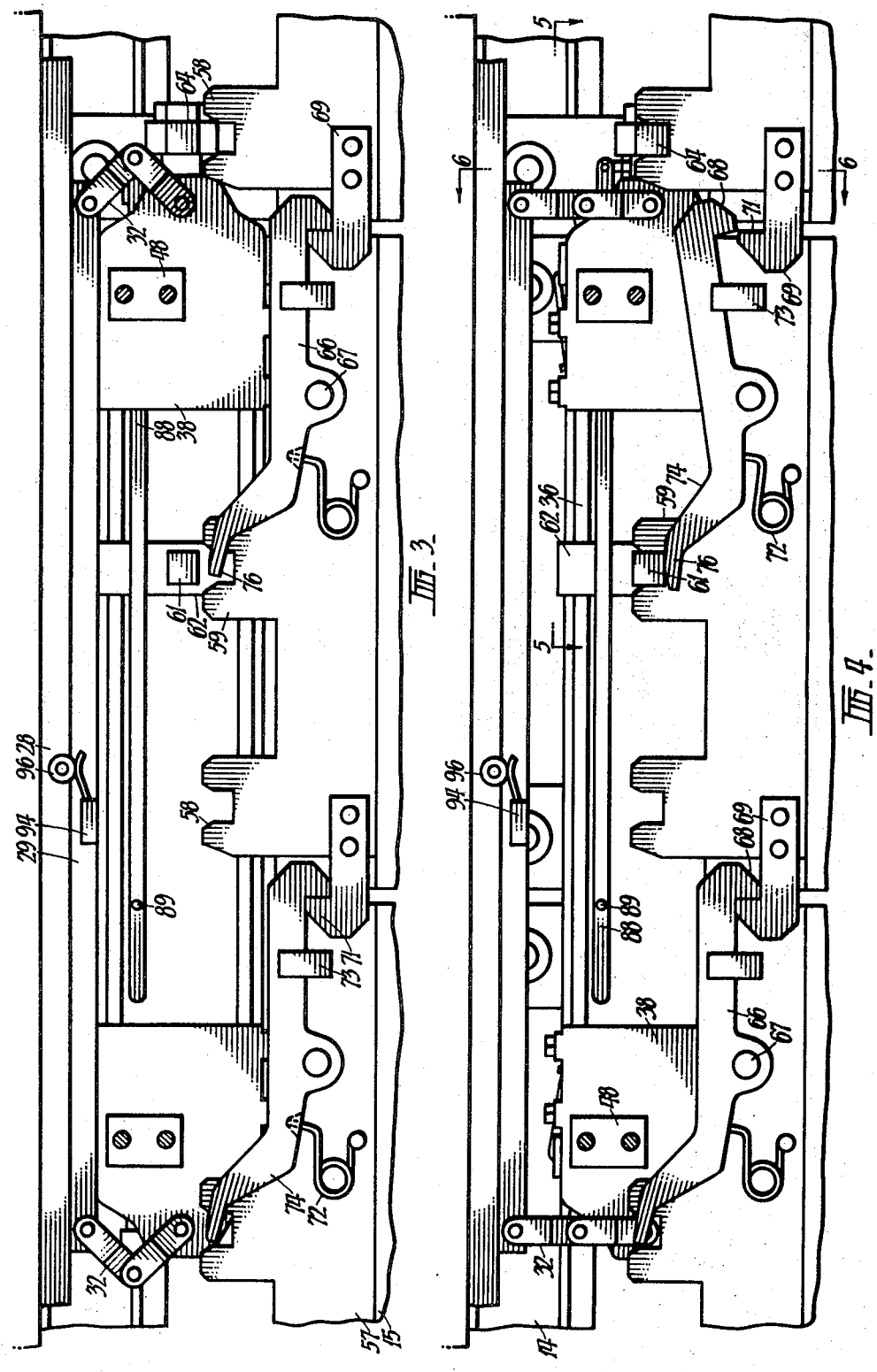

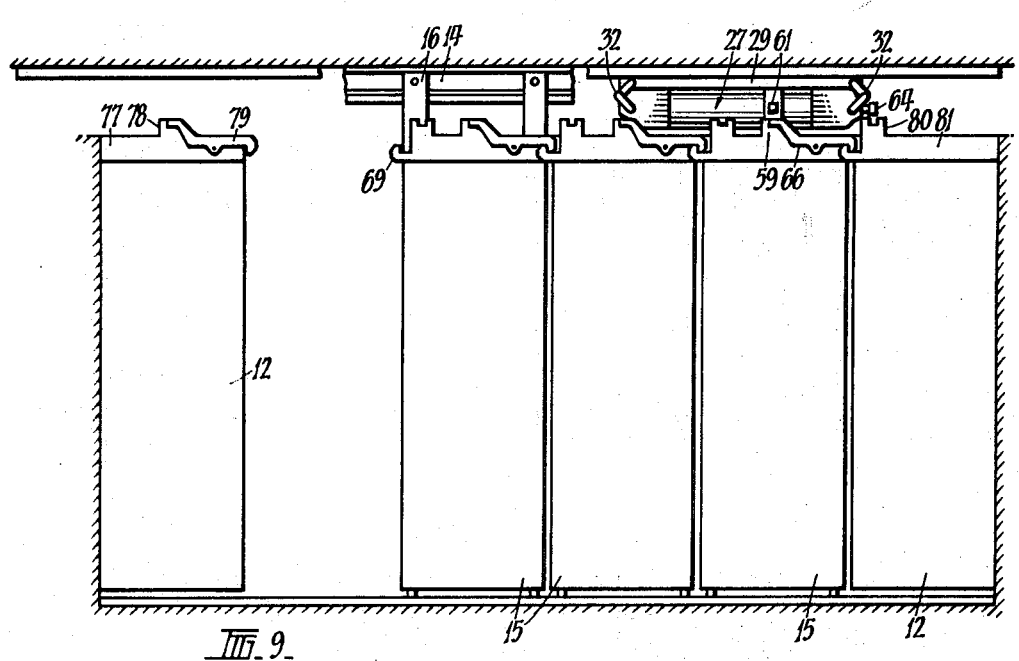
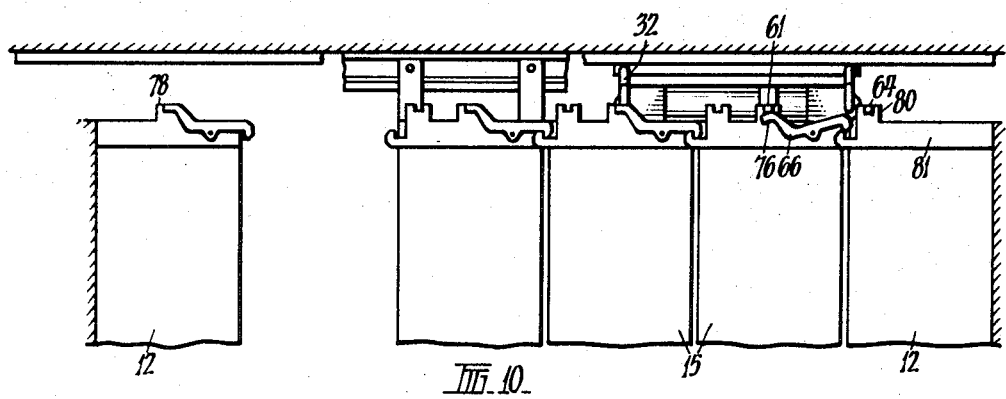
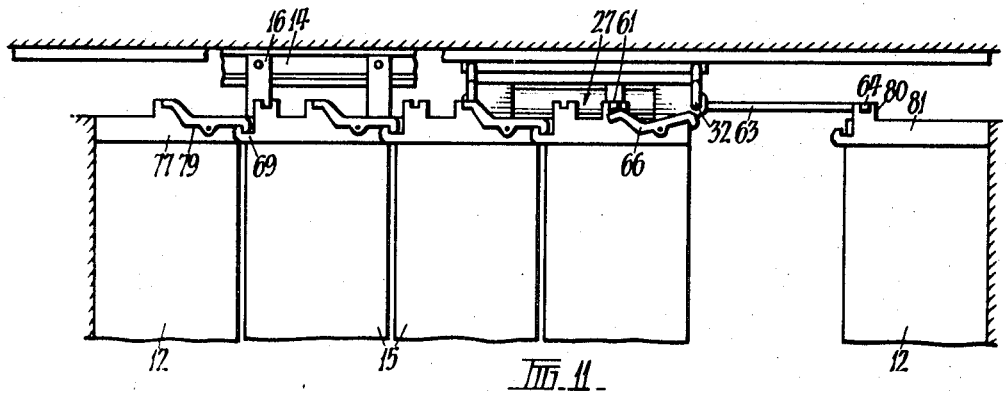

3,541,966

1

STORAGE FACILITY

BACKGROUND OF THE INVENTION

1. Field of the invention

This invention relates to storage facilities and more particularly to facilities providing what is commonly known as "mobile storage".

2. DESCRIPTION OF PRIOR ART

Conventional mobile storage facilities comprise a number of storage structures mounted on floor track such that they can be pushed together but such that an access space can be created between any pair of adjacent structures by pushing the structures along the track. Some form of drive means may be provided in order to drive the structures along the track. Usually, this is a cable drive, each structure being provided with a clamp operable to grip a motor-driven cable passing beneath the structures. Such an arrangement has the disadvantage that the drive components are covered by the structures and are therefore inaccessible for service and maintenance. Furthermore, the drive motor for the cable takes up additional floor space. The present invention provides a mobile storage facility in which this problem is avoided and which is more convenient in operation than conventional facilities of this type.

SUMMARY OF THE INVENTION

A mobile storage facility constructed in accordance with this invention comprises a plurality of storage structures which are movable along a track, extensible power means which is movable so that it can be positioned to engage at least one storage structure of any adjacent pair of storage structures which are in buff with one another such as then to be operable to exert a force on said one structure of the pair to move that structure away from the other structure of the pair, the reaction to said force being resisted by engagement of said extensible means with the other structure of said pair or with a fixed component of the facility.

Preferably, said track is an overhead track from which said storage structures are suspended.

Preferably too, each storage structure is provided with at least one abutment for engagement with the power means and the power means can be engaged with one abutment of each structure of any pair which are in buff so as to be operable to move those structures apart.

The power means may be a double-acting pneumatic ram.

The facility may also be provided with latching means to provide latch connections between the structures which are in buff with one another thereby to prevent accidental separation of those structures.

In order that the invention may be more fully explained, one particular embodiment thereof will now be described in detail with reference to the accompanying drawings.

BRIEF DESCRIPTION OF THE DRAWINGS

In the drawings:

FIG. 3 is a scrap view of part of the facility showing latches connecting three of the storage structures together and a driving ram of the facility positioned over the storage structures but out of engagement therewith;

FIG. 4 is a view corresponding to that on FIG. 3 but shows the driving ram engaged with two of the storage structures and one of the latch connections broken;

FIGS. 9, 10 and 11 are diagrammatic front views of the facility during various stages of its operation.

DESCRIPTION OF THE PREFERRED EMBODIMENT

Figure 1:
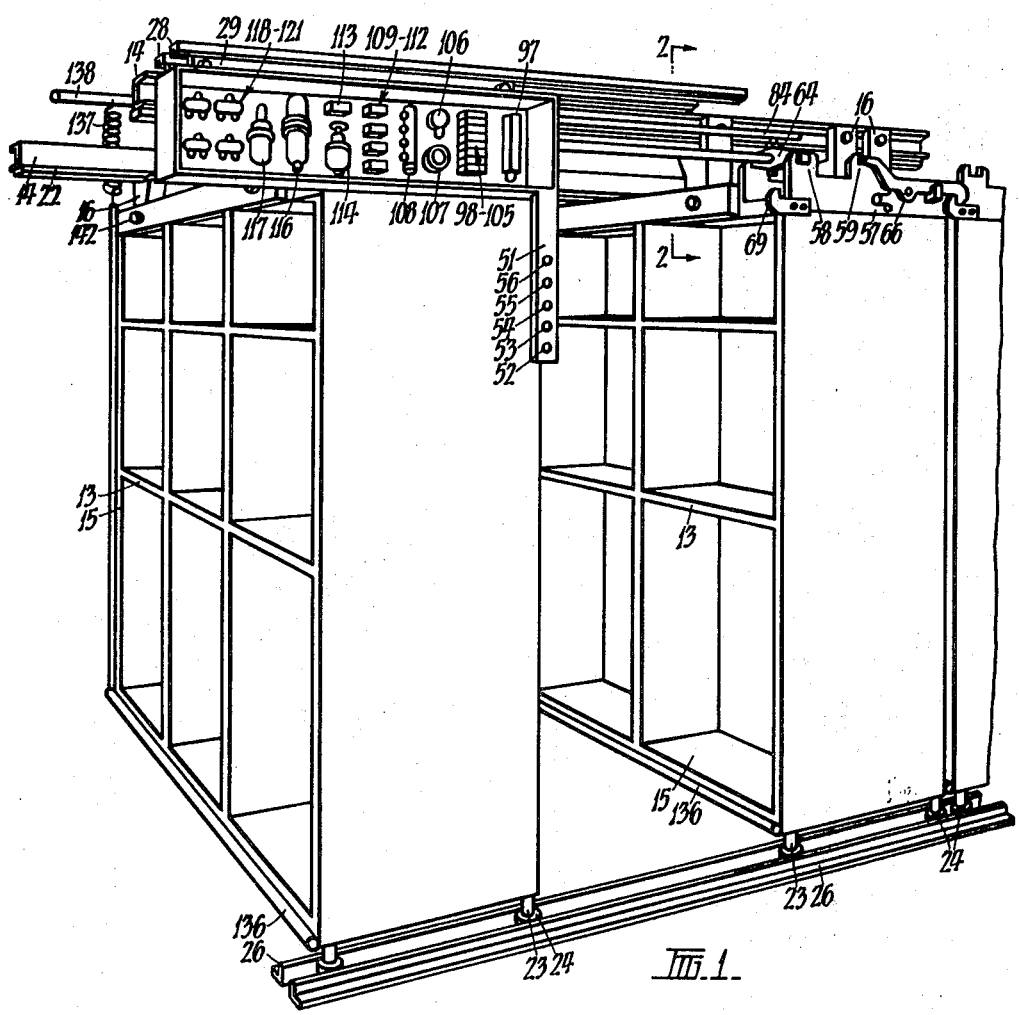
FIG. 1 is a perspective view of a mobile storage facility which has been designed specifically for installation in a ship and is therefore provided with latching means to prevent the storage structures from moving during rolling and pitching of the ship.
Figure 2:
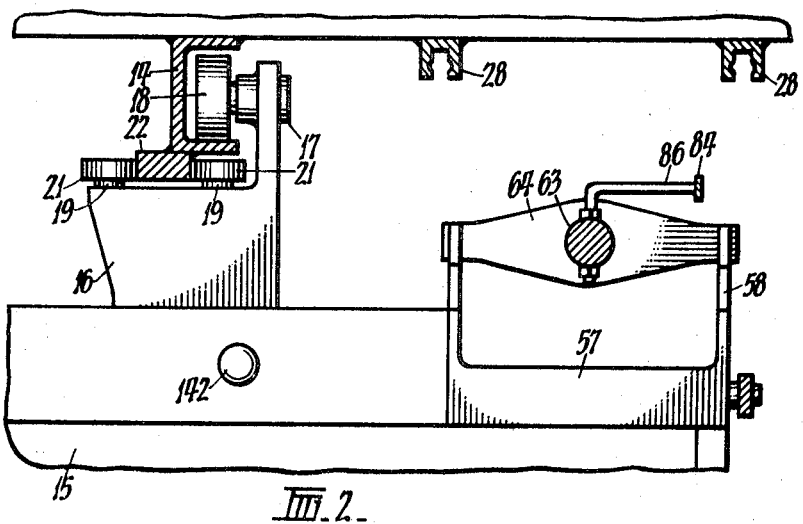
FIG. 2 is a cross section on the line 2-2 in FIG. 1.

The illustrated mobile storage facility comprises five storage structures disposed along an overhead track. The two end structures 12 are fixed but the three intermediate structures 15 are suspended from the overhead track so that they can be moved along the track. The latter structures will hereinafter be referred to as "mobiles". End structures 12 and mobiles 15 are each provided with folded sheet metal shelving 13 to receive goods for storage.

The main overhead track is constituted by a pair of laterally spaced channel irons 14 arranged with their open mouths facing laterally outwardly. Each mobile is fitted with upwardly projecting brackets 16 carrying laterally inwardly projecting stub axles 17 for main supporting rollers 18 which run between the flanges of channel irons 14. Brackets 16 also carry vertical stub axles 19 fitted with guide rollers 21 which engage accurately machined side guide rails 22 which are welded to the undersides of channel irons 14.

Mobiles 15 hang from the overhead track with some clearance from the floor and the bottom of each mobile is provided with a pair of vertical pegs 23 fitted with rollers 24 which run in a floor track constituted by a pair of angle irons 26 extending longitudinally of the overhead track. The engagement of these lower guide rollers 24 with the floor track helps stabilise the mobiles against lateral tipping during rolling of the ship.

Mobiles 15 are moved along the overhead track by means of a pneumatic ram 27 which is mounted on a further overhead track extending parallel to the main overhead track and above the front faces of the bins. This ram track is comprises of a pair of laterally spaced fixed channels 28. A pair of runner plates 29 are mounted in these channels for longitudinal running movement by means of balls 31 and each end of ram 27 is suspended from runner plates 29 by two pairs of toggle links 32.

Ram 27 has a conventional cylinder assembly 33 comprising a pair of end pieces 34 connected by four tie rods 36. Each end of this cylinder assembly is fitted with a pair of vertical wing plates 38 to which the toggle links are connected. Wing plates 38 have upper and lower inwardly projecting lugs 39 in which curved notches 41 are formed to engage the tie rods 36 of the ram cylinder assembly. Pointed grub screws 42 screw through threaded holes in lugs 39 to bear against tie rods 36 and thereby clamp wing plates 38 firmly to the ram cylinder assembly.

The wing plates 38 have outwardly projecting bosses 43 to which toggle links 32 are pivotally connected and one of these plates at each end of the ram 27 supports a small pneumatic ram 44, each ram 44 being mounted on its respective wing plate by means of a collar 46 fastened to the wind plate an clamped around the cylinder of the ram. The piston rods 47 of rams 44 are connected by means of yokes 48 to the toggle links 32 at the two ends of the main ram 27 so that extension of rams 44 actuates the toggle links so as to raise main ram 27, whereas retraction of rams 44 causes the main ram to be lowered. FIG. 3 shows the ram 27 in a raised position and FIG. 4 shows the ram lowered with the toggle links 32 then hanging vertically.

A control console 48 is fastened to the front wing plate 38 at the right hand end of the main ram via a bracket 49. This console carries components of a pneumatic control circuit to be described hereinafter and has a depending arm 51 fitted with five pushbutton controls 52, 53, 54, 55, 56. The whole ram assembly can be run along the ram track by manually pulling on arm 51 of the control console.

The top of each mobile is provided with a channel member 57 having upright flanges, the upper edges of which are profiled to define two pairs of forks 58, 59, each pair being spaced laterally of the bin with their prongs directed upwardly. Channel members 57 are disposed beneath the ram track, *i.e.* at the front of the mobiles, and forks 58 are disposed at the left hand ends of the mobiles and whereas forks 59 are disposed some distance to the right.

The cylinder assembly of main ram 27 is provided between its ends with a pair of square pins 61 which project horizontally one from each side thereof. Pins 61 are in fact fastened to a collar 62 which is fitted around the ram assembly. The end of the piston rod 63 of the main ram carries a crossbar 64. The arrangement is such that when a pair of bins are in buff with one another, the main ram can be run along the ram track in a raised condition and positioned over the bins with its cross pins 61 and crossbar 64 positioned respectively over the fork 59 of one bin and the fork 58 of the other bin as shown in FIG. 3. The ram can then be lowered by retraction of small rams 44, and pins 61 and crossbar 64 then engage the two forks as shown in FIG. 4. This movement releases the latch means between the bins and the ram can then be operated to support the bins.

The structure and operation of the latches on the mobiles is best seen in FIGS. 3 and 4. Each mobile is provided adjacent its right hand side with a latch member 66 pivotally connected to the channel member 57 of the mobile by means of a pivot pin 67. The latch member projects form the right hand side of the mobile and its projecting end has a downwardly depending tooth 68. Each mobile is further provided at its left hand side with a latch cleat 69 bolted to the left hand end of its channel member 57 and provided at its left hand end with an upstanding tooth 71. Coiled springs 72 are provided to bias latch members 66 so that their right hand ends are forced downwardly and stops 73 are provided to limit their downward pivoting movement.

When two mobiles are moved into buff with one another, the tooth of the latch member at the right hand end of one bin "rides over" the tooth of the cleat at the left hand end of the other mobile and falls into locking engagement therewith. The two mobiles will then remain locked together until the latch member 66 is lifted. The left hand end of each latch member is cranked upwardly at 74 and terminates in a tongue 76 which lies closely adjacent the fork 59 of the channel member 57 on which the latch member is mounted so that when cross pins 61 of the main ram are engaged with this fork, one of them depresses tongue 76 to lift latch member 66 out of engagement with its respective cleat 69. Thus when ram 27 is lowered so that its cross pins 61 and crossbar 64 engage the forks 59 and 58 respectively of any two mobiles which are in buff with one another, the latch connection between the two mobiles is automatically released and extension of the ram will then force the two mobiles apart. One of the mobiles will remain stationary while the other mobile moves and pushes any mobiles which are latched to it in order to close up the access space which was previously in the facility.

As shown in FIGS. 9 to 11, the left hand fixed storage structure 12 is provided with a channel member 77 which is similar to channel members 57 of the mobiles but is provided with only one pair of forks 78 corresponding to forks 59 of the channel members 57. Channel member 77 is fitted with a latch member 79 identical to the latch members 66. The right hand fixed storage structure 12 is provided with a channel member 81 defining only one pair of forks 80 corresponding to the forks 58 of the mobile channel members 57. FIGS. 9 to 11 also demonstrate the manner in which an access space may be created immediately to the left of the right hand fixed storage structure 12 by moving the mobiles to take up a previously existing access space to the left of the mobiles. As shown in FIG. 9, the ram is run along the ram track in a retracted and raised position to a position in which its crossbar 64 is directly upon the fork 80 of the right hand fixed storage structure. The cross pins 61 of the ram are then directly above the forks 59 of the mobile 15 which is latched to that fixed structure. The small rams 44 are then retracted so that the power ram 27 drops and its cross pins 61 and crossbar 64 engage the respective forks, the latch connection being broken in the process as shown in FIG. 10. Ram 27 is then extended to move the three mobiles together as a unit to take up the previously existing access space. The ram is extended until the left hand mobile 15 abuts the left hand fixed storage bin 12 and latch member 79 of the fixed storage structure engages the cleat of the left hand mobile so that the mobiles and the left hand fixed storage bin are all latched together as a unit as shown in FIG. 11. Power ram 27 may then be raised and retracted.

Figure 5:
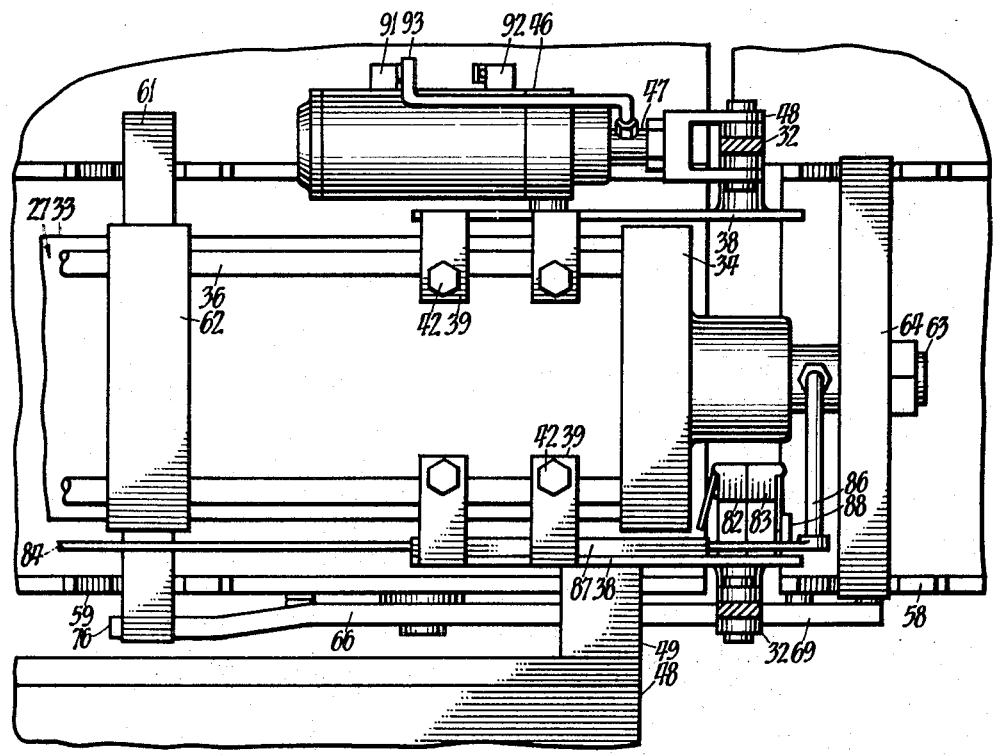
FIG. 5 is a section on the line 5-5 in FIG. 4.
Figure 6:
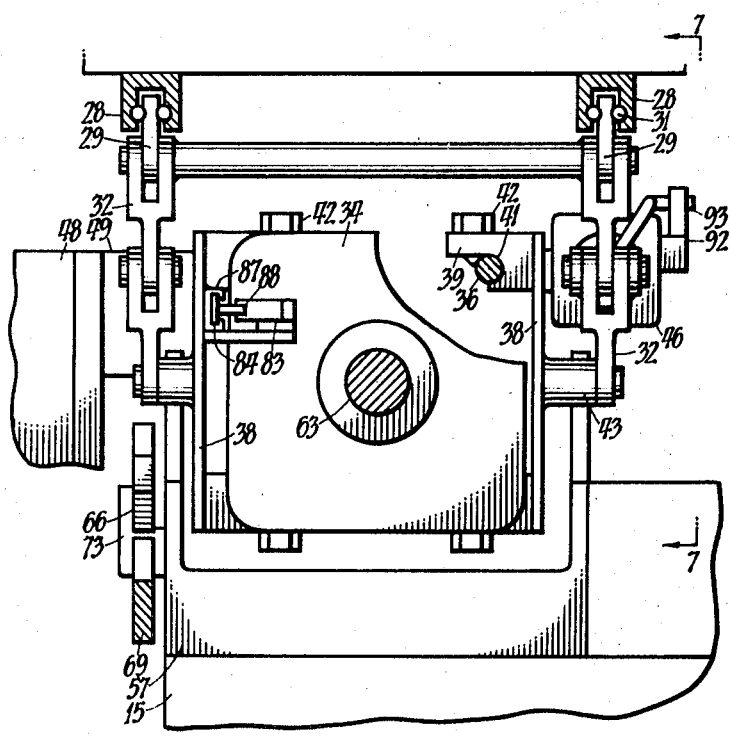
FIG. 6 is a section on the line 6-6 in FIG. 4.
Figure 7:
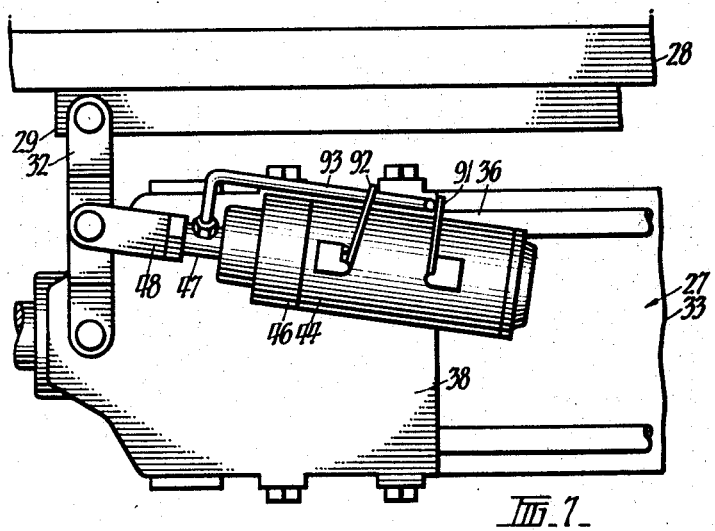
FIG. 7 is a view on the line 7-7 in FIG. 6.

As mentioned above, the facility has a pneumatic control circuit incorporating components which are mounted on console 48. The circuit also comprises sensing devices for sensing the condition of rams 27 and 44. The sensing devices for ram 27 are in the form of a pair of flexure leaf operated air valves 82, 83, mounted on the front wing plate 38 at the right hand end of the ram (see FIG. 5). Piston rod 63 of ram 27 is connected by a rod 86 to a long bar 84 which is slidable in a channel guide 87 mounted on the same wing plate 38. Bar 84 carries a pin 88 adjacent its right hand end and a pin 89 adjacent its left hand end. When ram 27 is retracted, pin 88 is in engagement with the flexure leaf of valve 83 and holds that valve in a condition in which it will transmit a pneumatic signal. Such a condition will be referred to as a "closed" condition and a valve of the control circuit which is conditioned so as not to transmit a pneumatic signal will be described as "-closed". Adoption of this convention is appropriate since the valves of the control circuit are pneumatic equivalents of switches in an electric switching circuit. When ram 27 is retracted valve 82 is open. When the ram is extended, bar 84 is drawn through its guide and when the ram piston rod 63 reaches the end of its stroke, pin 89 engages the leaf element of valve 82, thereby closing that valve. Each ram 44 is provided with similar sensing devices, in the form of pneumatic valves 91, 92, operated by a bar 93 connected to the piston rod 47 of the ram. Valve 91 is actuated when the ram is fully retracted and valve 92 is actuated when the ram is fully extended. A further leaf operated pneumatic valve 94 is mounted on one of the runner bars 29 and is actuated when the ram carriage is correctly positioned above the forks of a pair of bins by means of one of a number of rollers 96 spaced along the overhead ram track.

The components of the pneumatic circuit which are mounted on console 48 are a low pressure manifold tube 97; eight turbulance amplifiers 98, 99, 100, 101, 102, 103, 104, 105; pressure regulators and gauges 106, 107; a pilot air manifold 108; four step-up relays 109, 110, 111, 112; an adjustable speed control valve 113; a low pressure regulator and gauge 114; an air filter 116; an air lubricator 117 and four 3-port, normally on, air operated control valves 118, 119, 120, 121.

Figure 8:
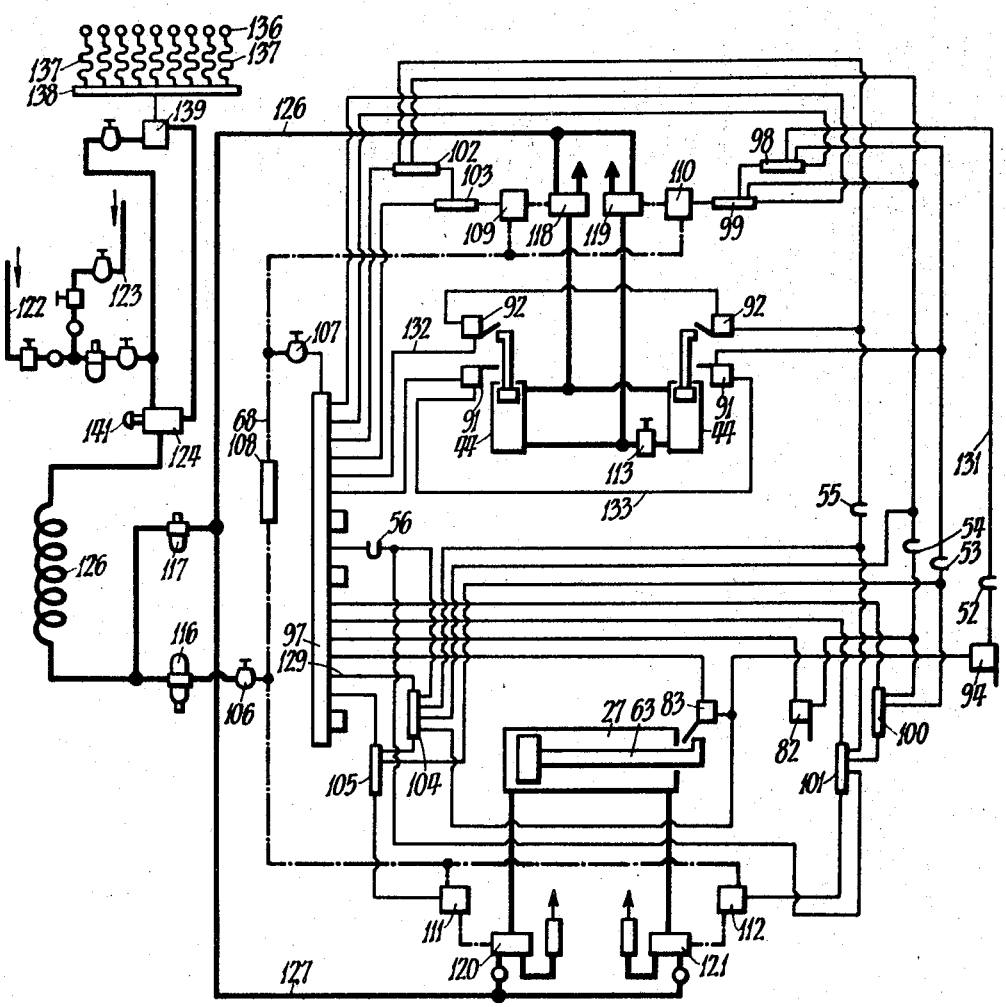
FIG. 8 is a circuit diagram of a pneumatic control circuit of the facility.

The layout of the pneumatic circuit is shown diagrammatically in FIG. 8. Air up to approximately 150 p.s.i. is supplied from a continuous supply via a line 122 or, if the supply fails, from a high pressure storage cylinder through a line 123 through appropriate valves, pressure regulators and filters to a 3-port air operated valve 124 and thence through a flexible hose 126 to the control console 48 where it is passed to filter 116 and lubricator 117. High pressure air is fed from lubricator 117 via lines 126, 127 to control valves 118, 119, 120, 121 which control the flow of the high pressure air to rams 44 and 27. Air is taken from filter 116 through pressure regulator 106 to pilot air manifold 108 at approximately 60 p.s.i. The pilot air manifold is connected, as shown by the chain lines in the circuit diagram, to step-up relays 109, 110, 111, 112 which provide pilot air for operation of control valves 118, 119, 120, 121.

Air is also fed from pilot air manifold 108 through pressure regulator 107 to low pressure manifold 97 which feeds a low pressure pneumatic circuit incorporating the pushbuttons 52, 53, 54, 55, 56, the sensing valves 82, 83, 91, 92, 93, 94 and the turbulence amplifiers 98 to 105. The turbulence amplifiers each have a main throughput passage and a number of side ports to which pneumatic signals can be fed. For example, turbulence amplifier 104 has a throughput passage connected directly to low pressure manifold 97 via a line 129 and four of its side ports connected to other lines of the circuit to receive signals. If any of these four ports receive a signal, turbulence is created within the throughput passage to cut off the flow of air through this passage. Thus, each amplifier serves as a pneumatic equivalent of an electronic "or" gate.

The circuit is designed on logic principles so that the cycle of operation of the rams 27, 44 is controlled merely by pressing the five pushbuttons on the control console and is arranged so that incorrect operations which could possibly lead to accidents is impossible. For example, when the power ram 27 is positioned as shown in FIG. 3 of the drawings, it can be lowered by pressing pushbutton 52. Sensing valve 94 is held closed by engagement with roller 96 and sensing valve 83 is held closed by the position of piston rod 63 of ram 27 so that when the pushbutton is depressed air flows from low pressure manifold 97 through sensing valves 83, 94 along line 131 to turbulence amplifier 98.

This cuts off the flow of air from pressure manifold 97 through the main passage of turbulence amplifier 98, which had previously been preventing passage of air through turbulence amplifier 99 to step-up relay 110 controlling control valve 119. Air now flows through turbulence amplifier 99 to step-up relay 111 and control valve 119 is actuated to vent the previously pressurised ends of the cylinders of rams 44. These rams therefore start to retract under the weight of the main ram causing sensing valves 92 to open, thereby stopping the flow of low pressure air through line 132 to turbulence amplifier 102. This allows the flow of air through turbulence amplifier 102 which had previously been allowing the flow of air through turbulence amplifier 103 to step-up relay 109. The latter step-up relay now releases to release control valve 118 to admit high pressure air to the cylinders of rams 44 to force the pistons of those rams positively through the remainder of the retraction stroke. At the end of this retraction stroke, (normally open) sensing valves 91 are closed causing a low pressure air signal to flow through line 133 to turbulence amplifier 98 which causes conditioning of turbulence amplifier 99 such that control valve 119 is held in venting condition when the pushbutton is released. The circuit is now conditioned such that operation of pushbutton 54 will cause main ram 27 to extend. At the completion of the extension stroke of main ram 27, operation of pushbutton 53 will cause the main ram carriage to be raised and then pushbutton 55 can be operated to retract the main ram. Action of the various components of the pneumatic control circuit during these steps will not be described in detail since this can readily be deduced from FIG. 8. However, one of the safety features of the circuit will be mentioned by way of example. It will be seen from the circuit diagram that operation of pushbutton 54 will have no effect until main ram 27 is extended to open sensing valve 82 thereby to provide a low pressure air supply to that pushbutton. Thus the main ram carriage cannot be lifted until the main ram has completed its extension stroke. This prevents lifting of the main ram when any of the mobiles are in an unlatched condition and would otherwise be free to move on the track under the influence of the ship's motion.

Pushbutton 56 is provided to enable main ram 27 to be retracted in case of an emergency. It will be seen from the circuit diagram that operation of this pushbutton at any time will cause retraction of the main ram.

A further safety feature is, provision of pneumatic bumpers 136 in the form of flexible rubber tubes mounted on the lower end of the mobiles. These tubes are connected by flexible hoses 137 to a signal intensifier manifold 138 leading to a step-up relay 139 which on actuation cuts off the air supply by operation of valve 124. If extension of the main ram were inadvertently initiated when a person was standing in an access space, the bumper 136 on that mobile would strike the person and transmit a signal through intensifier manifold 138 to step-up relay 139, thereby cutting off the air supply and sealing off the whole circuit so that all the rams were locked. Valve 124 can then be manually reset by pushing its button 141.

As shown in FIG. 1, the left hand face of each mobile is provided with a pair of resilient stops 142. At the completion of the extension stroke of the main ram, these stops are compressed by about 1/16 inch. The resistance of the stops is sufficient to throw the main ram into a stall condition and their compression is such as to ensure that latch members 66 engage correctly with latch cleats 69.

The above described facility is simple in operation and all of the components of the pneumatic circuit are fully accessible for inspection and maintenance. Furthermore, the facility incorporates latches which are released automatically at the appropriate times during a cycle of operation and relatively simple, entirely pneumatic control circuit prevents incorrect operation. However, this facility has been advanced by way of example only and many variations are possible. For example, the mobiles could be provided at their lower ends with further latch members ganged to the upper latch members by vertical connecting rods. The lower ends of the connecting rods could be connected to the lower latch members by a pin and slot connection such that each lower latch member follows the operation of its associated upper latch member but not vice versa, i.e. the lower latches cannot "over-ride" the upper latches. Furthermore, in many installations the latches may not be required and in this case each mobile can be provided with one pair of forks only. One reason for the provision of two pairs of forks on each mobile was to enable one pair of forks on each of the upper mobiles to be engaged by the ram while only one latch connection was released.

In another modification, the fork on the mobiles could be raised and lowered to engage and disengage the ram instead of vice versa. In relatively small facilities with no latching, the mobiles could be provided with a fixed fork and a small ram carried manually into position and dropped into engagement with the appropriate forks.

In a further modification the power ram could, instead of acting on both of a pair of mobiles to be separated, act on one of those mobiles and a fixed component of the facility. For example, the cylinder end of the ram could be provided with a clamp operable to clamp onto the ram track thereby firmly to anchor the cylinder of the ram and resist the reaction to the force which the ram exerts on the mobile. Alternatively, the cylinder end of the ram could engage a sturdy abutment fixed to a frame of the facility when the ram was lowered prior to being extended, an appropriate number of fixed abutments being provided along the facility to enable any pair of mobiles to be separated.

In all cases the ram could of course, be operated hydraulically rather than pneumatically. It would also be possible to replace the power ram by some other form of extensible power means, for example an electrically operable extensible device. A suitable device could incorporate a linear electric motor or a conventional electric motor coupled to a worm or rack and pinion drive to provide linear extension and retraction movement.

The storage structures in the illustrated construction are provided with shelving. However, these structures may take a variety of forms. For example, a large facility in accordance with the invention could have mobiles capable of receiving cars to provide high density car parking. A number of such facilities could be arranged in banks to provide a complete high density car park.

I claim:

1. A mobile storage facility comprising a track, a row of storage structures which are movable along the track into and out of buff with one another, and a ram device which is movable bodily along the row of storage structures so that it can be positioned to engage at least one storage structure of any adjacent pair of said storage structures which are in buff with one another such as then to be operable to separate said pair of structures.

2. A mobile storage facility as claimed in claim 1, further comprising a second track on which said ram device is mounted for bodily movement along that second track and thus along the row of storage structures.

3. A mobile storage facility as claimed in claim 1, wherein each storage structure is provided with at least one abutment for engagement with said ram device and the ram device can be engaged with one abutment of each structure of any pair of structures which are in buff so as to be operable to separate that pair of structures.

4. A mobile storage facility as claimed in claim 1, further comprising latching means to provide latch connections between the structures which are in buff with one another thereby to prevent accidental separation of those structures which latching means is such that the latch connection between any pair of said storage structures which are in buff with one another is disrupted consequent to positioning of said ram device for operation to separate that pair of structures.

5. A mobile storage facility comprising a first track, a plurality of storage structures which are movable along the track into and out of buff with one another, at least one abutment on an upper part of each storage structure, a second track extending above the storage structures and parallel with the first track, extensible power means movable along said second track so that it can be positioned to engage with one abutment of each structure of any pair of structures which are in buff so as to operable to separate that pair of structures.

6. A mobile storage facility as claimed in claim 5, wherein the extensible power means is lowerable and raisable with respect to said second track so that when raised it can be moved along the second track without engaging said abutments but when correctly positioned above any pair of structures which are in buff with one another it can be lowered to engage the appropriate abutments of those structures.

7. A mobile storage facility comprising a first track, a plurality of storage structures which are movable along the track into and out of buff with one another, a second track extending parallel with the first track and adjacent the upper parts of the storage structures, a fluid pressure operable ram, ram support means supporting said ram from the second track such that it is movable along the track and is movable bodily toward and away from the upper parts of the storage structures, fluid pressure operable ram means also supported on said ram support means for movement with the ram along the second track and operable to move the ram bodily toward and away from the upper parts of the storage structures, and at least one abutment located on the upper part of each storage structure such that when the ram is drawn away from the upper parts of the storage structures it can be moved along the second track without engaging the abutments but when correctly positioned adjacent any pair of storage structures which are in buff with one another it can be moved toward the upper parts of those structures.

8. A mobile storage facility as claimed in claim 7, further comprising a relatively high pressure fluid circuit incorporating control valves through which to supply relatively high pressure fluid to said ram means and said ram, and a relatively low pressure fluid control circuit to condition said valves.

9. A mobile storage facility as claimed in claim 8, wherein said control circuit incorporates manually actuable controls and turbulence amplifiers which serve as logical devices to enable operation of a multiplicity of said control valves consequent to actuation of only one of the manually actuable controls.

10. A mobile storage facility as claimed in claim 9, wherein said control circuit incorporates sensing devices associated with the ram means and said ram so as to be conditioned according to the condition of the ram means and said ram and influencing the control circuit to prevent any particular operation of said control valves unless the ram means and said ram are in a prerequisite condition.

11. A mobile storage facility comprising a track, a plurality of storage structures, which are movable along the track into and out of buff with one another, a fluid pressure operable ram which is movable so that it can be positioned to engage at least one storage structure of any adjacent pair of said storage structures which are in buff with one another such as then to be operable to separate said pair of structures, a valve via which fluid is supplied to said ram for operation thereof, a device on each storage structure which if struck will generate a fluid pressure signal, and means providing an operative connection between the signal generating devices and said valve such that a signal generated by any of the devices causes operation of the valve to disrupt supply of fluid to the ram.